US007734760B2

(12) United States Patent
Cen et al.

(10) Patent No.: US 7,734,760 B2
(45) Date of Patent: Jun. 8, 2010

(54) ESTIMATING THE LOCATION OF A NETWORK CLIENT USING A MEDIA ACCESS CONTROL ADDRESS

(75) Inventors: Shanwei Cen, Portland, OR (US); Steve C. Lo, Portland, OR (US); Manoj Agnihotri, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1021 days.

(21) Appl. No.: 10/367,285

(22) Filed: Feb. 14, 2003

(65) Prior Publication Data

US 2004/0162896 A1 Aug. 19, 2004

(51) Int. Cl.
*G06F 15/173* (2006.01)
*G06F 15/16* (2006.01)
(52) U.S. Cl. ....................................... 709/224; 709/227
(58) Field of Classification Search ................. 709/227, 709/203, 224, 204, 205, 206, 207, 225; 370/461, 370/252, 235
See application file for complete search history.

(56) References Cited

U.S. PATENT DOCUMENTS

| 2002/0037717 | A1 | 3/2002 | Laube et al. | |
| 2002/0184418 | A1 | 12/2002 | Blight | |
| 2003/0218570 | A1* | 11/2003 | Moore et al. | 342/465 |
| 2003/0225893 | A1* | 12/2003 | Roese et al. | 709/227 |
| 2004/0008722 | A1* | 1/2004 | Ellis et al. | 370/461 |
| 2007/0038759 | A1* | 2/2007 | Hanson et al. | 709/227 |
| 2007/0077889 | A1* | 4/2007 | Blight et al. | 455/41.2 |

FOREIGN PATENT DOCUMENTS

| CA | 2301474 | | 8/2000 |
| EP | 1267541 | A1 | 12/2002 |
| EP | 1267541 | A1 * | 12/2002 |
| EP | 1359714 | A2 | 11/2003 |

OTHER PUBLICATIONS

International Searching Authority, International Search Report, International Application No. PCT/US2004/000420, International Filing date Jan. 8, 2004, Intel Corporation.

* cited by examiner

*Primary Examiner*—Karen C Tang
(74) *Attorney, Agent, or Firm*—Blakely, Sokoloff, Taylor & Zafman LLP

(57) ABSTRACT

Embodiments of the present invention may be provided as a computer program product that may include a machine-readable medium having stored thereon instructions, which may be used to program a computer (or other electronic device) to perform a process according to one or more embodiments of the present invention. The machine-readable medium (i.e., non-transitory machine-readable medium) may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory. There are other types of media suitable for storing instructions. Moreover, embodiments of the present invention may also be downloaded as a computer program product, wherein the program may be transferred from a remote computer to a requesting computer via a communication link (e.g., a modem or network connection).

6 Claims, 6 Drawing Sheets

ESTIMATING THE LOCATION OF A NETWORK CLIENT USING A MEDIA ACCESS CONTROL ADDRESS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

The disclosed subject matter relates to the estimation of the physical location of a network client in communication with a Local Area Network (LAN).

2. Description of the Related Art

Currently, if a user of a network client device wishes to use a location specific feature of the network client, they would normally determine the location of the device from an exterior source, and then input that information into the device. Such an exterior source may be, for example, a device that accesses the global positioning system (GPS) or a paper map. This process often involves multiple devices and is frequently considered cumbersome and inconvenient.

It is possible to integrate a device that may access the global positioning system (GPS) with the network client. However, the addition of this GPS device is often expensive and serves only one purpose, the detection of the network client's location. In addition, GPS is primarily an outdoor positioning system and does not work well indoors, which is where network clients are frequently used. Furthermore, even if GPS is utilized, in order to derive a reliable human-scale indoor positioning, an augmentation technology should be employed. A need, therefore, exists for an improved system or technique for determining the physical location of a network client that is neither inconvenient nor expensive.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Local Area Network Environment

Figure 1:
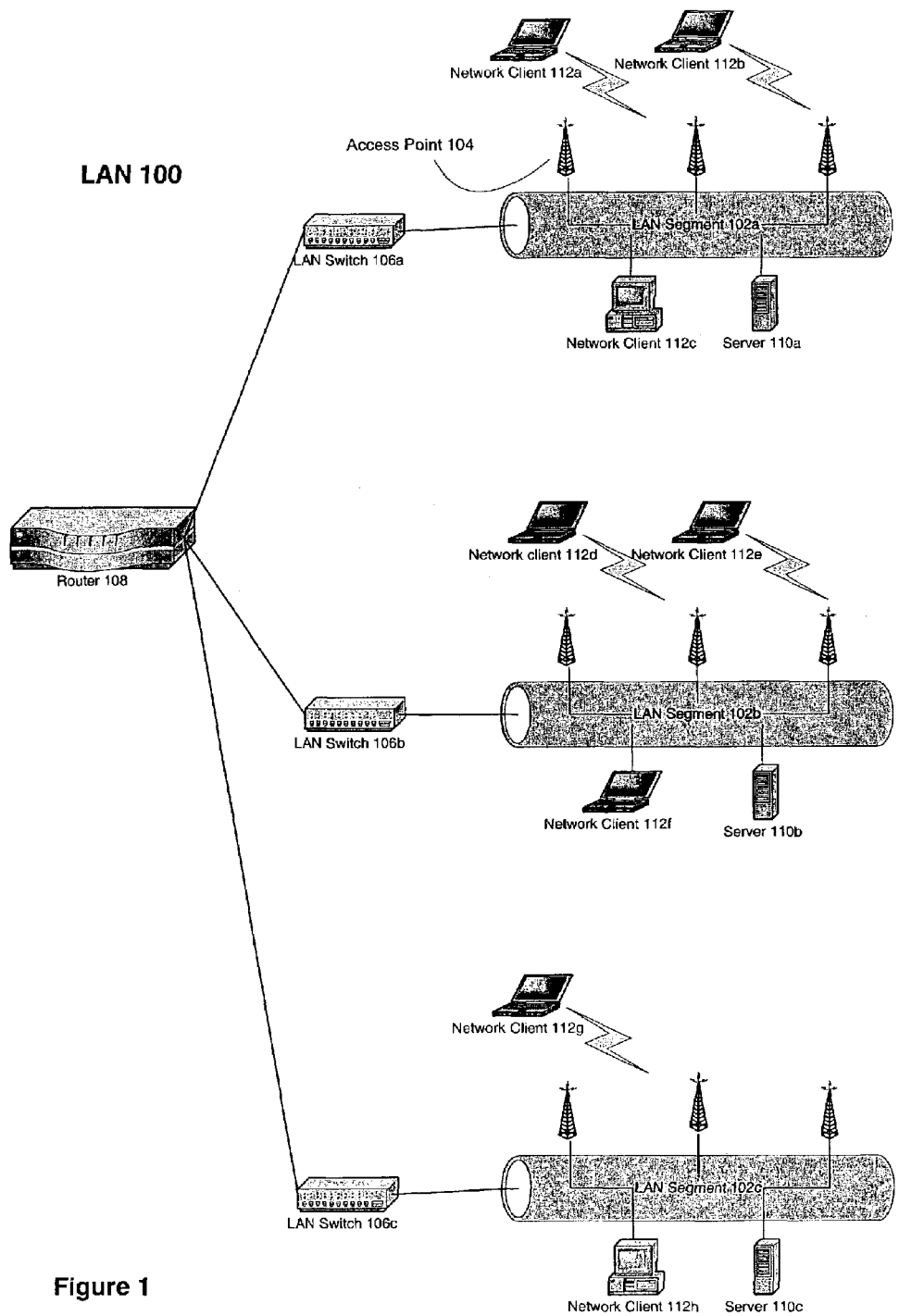
FIG. 1 is a block diagram illustrating an exemplary Local Area Network (LAN) environment in which various embodiments of the present invention may be employed.

One example Local Area Network (LAN) in which embodiments of the present invention can be implemented is now described with reference to FIG. 1. FIG. 1 shows the LAN 100 as including three LAN segments 102*a-c*. Each LAN segment is a switched LAN operating using LAN switches 106*a-c* respectively. The LAN segments 102 need not be switched LANs, but can use shared bandwidth protocols such as Ethernet. The switched LAN segments can use any LAN protocol, for example switched Ethernet, in which case the LAN switches 106 would be Ethernet switches. The LAN segments 102 are linked by a router 108. In one embodiment, the router 108 links the LAN to an outside network. In this case, the router 108 is also the default router for the LAN 100.

Each LAN segment 102 can be used by network clients 112*a-h* to access the LAN 100. Some network clients, such as network clients 112*c* and 112*h* can be desktop computers that access the LAN 100 using a wired line connection, such as a drop cable that plugs into a network drop. Network client 112*f* is a notebook PC, that is a laptop computer, which also accesses the LAN 100 using a wired line connection. Other network clients, such as network clients 112*a*, 112*b*, 112*d*, and 112*g*, are mobile network clients that access the LAN 100 using a wireless interface. The LAN 100 includes a number of wireless access points, such as access point 104. For example, using a wireless protocol, such as the *Supplement to* 802.11-1999, *Wireless LAN MAC and PHY specifications: Higher speed Physical Layer (PHY) extension in the* 2.4 *GHz band*, IEEE Std. 802.11b-1999 (hereafter "802.11b"), Bluetooth™ Special Interest Group (SIG) v1.0 Specification (hereafter "Bluetooth"), or similar protocol, mobile network client 112*a* can access the LAN 100 through access point 104. Each LAN segment 102 can also have a server 110*a-c* coupled to provide various server-related functionalities, such as serving documents, applications, web pages, and other resources. In other embodiments, one server, for example server 110*a*, can provide all server services to the entire LAN 100 and servers 110*b* and 110*c* can be omitted.

Several components of the LAN 100 provide access and communication between clients, servers, and other networks. These components are sometimes referred to as infrastructure nodes. In FIG. 1, for example, access point 104 and all other access points, LAN switches 106*a-c*, and router 108 are infrastructure nodes. The LAN 100 can include other infrastructure nodes. Furthermore, the LAN 100 can be used to connect other network peripherals, such as printers, scanners, back-up devices, and other such devices. The LAN 100 is given as only one example. Other LANs need not have multiple segments, switches, or even routers. Furthermore, not all LAN segments 102 need a server 110.

EXAMPLE

Network Client

Figure 2:
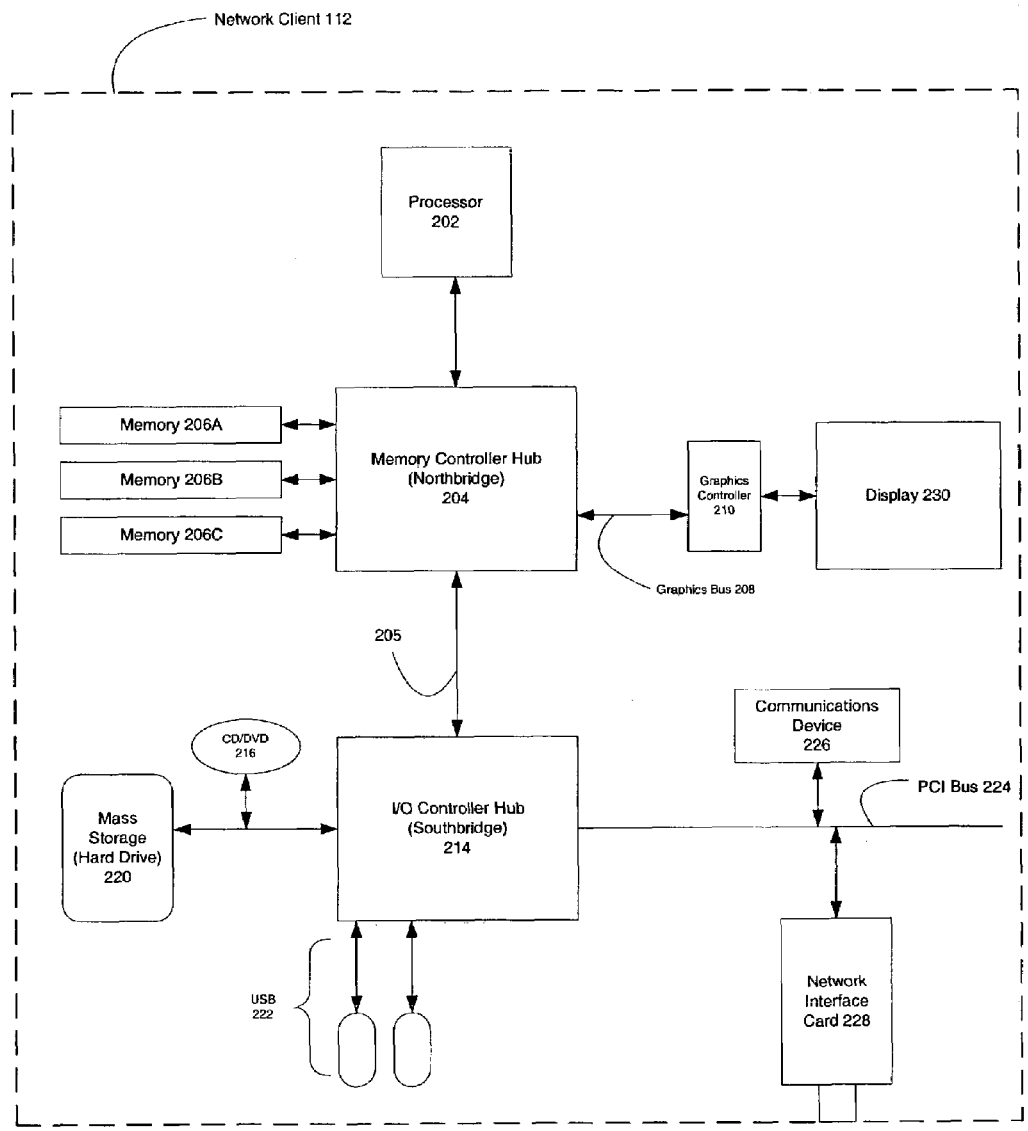
FIG. 2 is a block diagram illustrating an exemplary network client architecture in which various embodiments of the present invention may be employed.

An example network client 112, such as network client 112*a* from FIG. 1, that can use embodiments of the present invention to estimate its location is now described with reference to FIG. 2. The network client 112 illustrated in FIG. 2 is a notebook PC, which is only one possible architecture for the network client 112. The network client could also be a desktop computer, personal digital assistant (PDA), a network peripheral device such as a printer, or any other network device.

The network client 112 can have a memory controller hub 204 connecting the memory 206(A-C), the display 212, and the processor 202. In some mobile PCs architectures, the memory controller hub 204 is sometimes referred to as the Northbridge because it provides a bridge between the host processor 202 and the rest of the computer system. The processor can be a high-performance notebook central processing unit (CPU) commonly used in mobile PCs. The memory system 206(A-C) can include any storage medium used by mobile PCs. For example, memory 206A can be a static random access memory (SRAM), memory 206B can be a dynamic random access memory (DRAM), and memory 206C can be a read only memory (ROM). The display 212 can be a liquid crystal display (LCD) display or other suitable display technology. The display 212 can be connected to the memory controller hub 204 by a high-speed graphics bus 208 and graphics controller 210, such as an Accelerated Graphics Port (AGP) bus.

In one embodiment, the input/output (I/O) controller hub 214, also known in some architectures as the Southbridge, is connected to the memory controller hub 204 by a point-to-point connection 205. In other architectures, a shared bus may link them. The I/O controller hub 214 controls the operation of the mass storage 220, such as a hard drive, the CD/DVD drive 216, the Universal Serial Buses (USBs) 222, and the Peripheral Component Interconnect (PCI) bus 224. The PCI bus 224 can be used to connect a communications device 226, such as a modem and/or wireless transceiver, to the mobile PC.

Furthermore, the PCI bus 224 can be used to connect a network interface card (NIC) 228, such as an Ethernet card or an 802.11 card, to the Mobile PC. The NIC 228, can be used to access a Local Area Network, such as LAN 100 in FIG. 1 using either a wired line connection or a wireless connection. The NIC 228, for example an 802.11 card, has a unique media access control (MAC) address burned on it. If the NIC 228 is an Ethernet card, the MAC address may be called an Ethernet Address, which, like some other MAC address specifications, is a globally unique six-byte number.

Location Estimation

Figure 3:
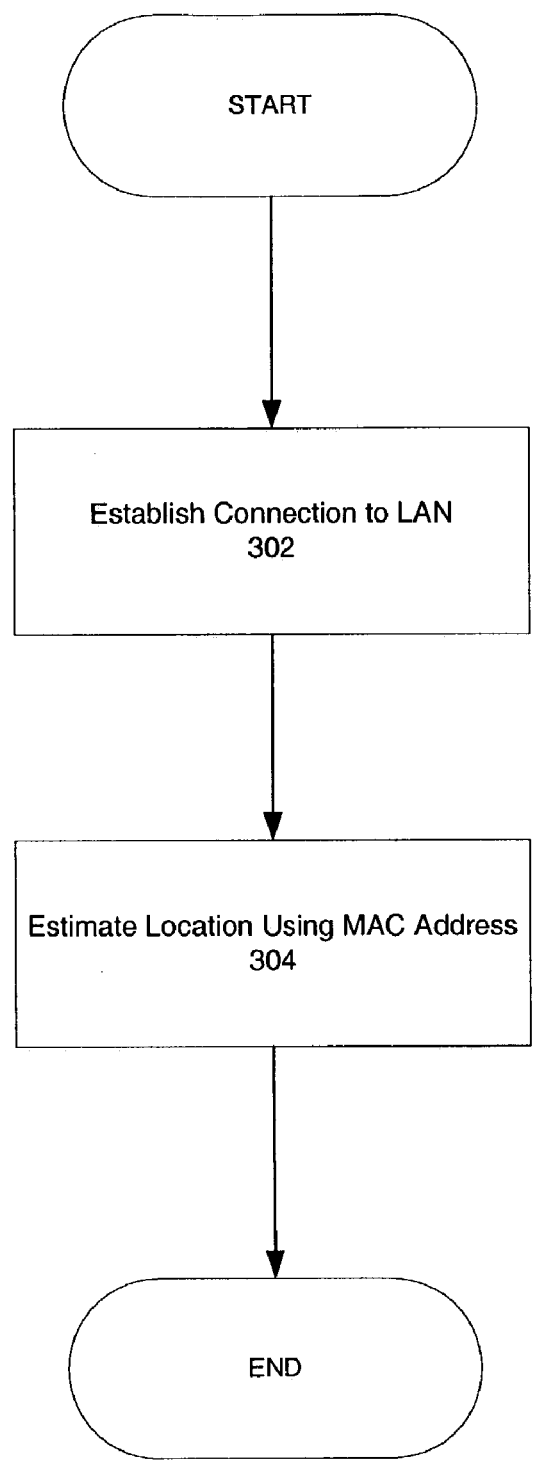
FIG. 3 is a flow diagram illustrating location estimation according to one embodiment of the present invention.

One embodiment of a process for estimating the location of a network client 112 is now described with reference to FIG. 3. In block 302, the network client 112 establishes a connection with the LAN 100. This connection may be a wired line connection or a wireless connection using an appropriate LAN protocol. For example, wired line connections can use the Ethernet protocol and wireless connections can use a wireless protocol such as 802.11b. In Block 304, the network client 112 estimates its location using a MAC address. The MAC address can be the MAC address burned on the NIC 228 used by the network client 112, the MAC address of an access point 104 used by or accessible to the network client 112, the MAC address of a router 108 used by the LAN 100, such as a default router, or the MAC address of any other infrastructure node.

Figure 4:
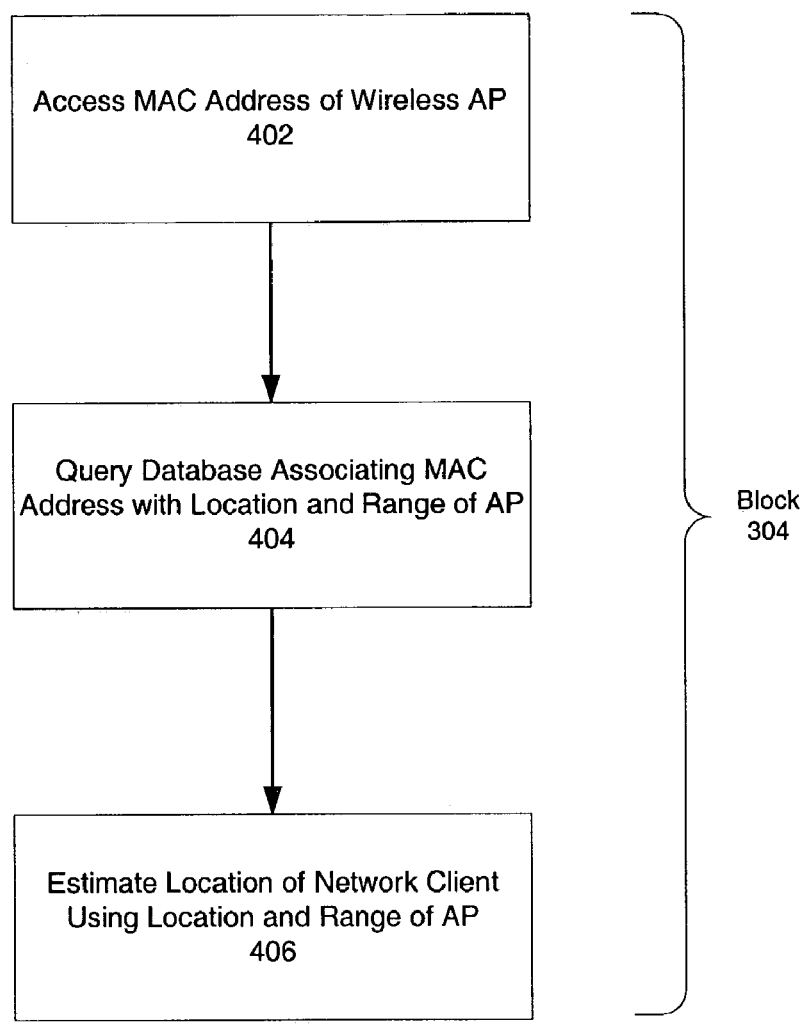
FIG. 4 is a flow diagram illustrating location estimation according to a specific embodiment of the present invention.

One specific implementation of block 304 is now described with reference to FIG. 4. In this embodiment, the network client 112 is a mobile network client accessing the LAN 100 wirelessly, such as network client 112a accessing the LAN 100 using wireless access point 104 in FIG. 1. The wireless access point 104 has a globally unique MAC address, sometimes referred to as the BSSID for 802.11b LANs, which it uses to provide access to mobile clients.

In block 402, the network client 112 accesses the MAC address of the wireless access point 104. Generally, the MAC address of the wireless access point 104 will have been communicated to the network client 112 upon the establishment of the connection. Furthermore, wireless access points also broadcast signals containing their MAC addresses. A network client can access their MAC addresses by listening for this signal.

In block 404, the network client 112 queries a database associating the MAC address of the access point 104 with the physical location of the access point 104. Such a database may be created in a number of ways and may be stored in a number of locations, such as one of the servers 10a-c, another node on the LAN 100, or at a central database outside of the LAN 100 accessible through the router 108. Such a database stores the MAC addresses of all or most of the infrastructure nodes, such as the access points, of the LAN 100. The MAC address of the access point 104 is associated by the database with a location. The location can include the coordinates of the access point 104 (i.e. latitude, longitude, altitude), and communications range of the access point 104.

In block 406, the network client 112 estimates its location using the location and range of the access point 104. In one embodiment, the network client 112 approximates its location as being somewhere in the area covered by the range of the access point 104. In other embodiments, the network client 112 can use other information to improve on this estimate.

Figure 5:
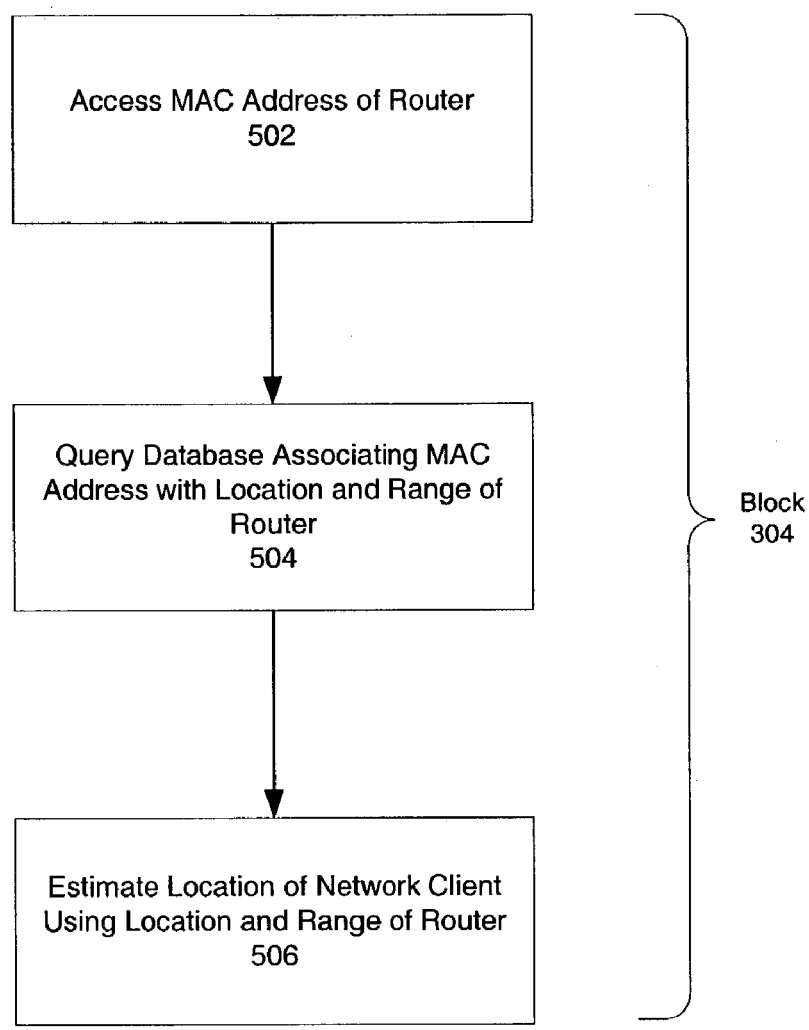
FIG. 5 is a flow diagram illustrating location estimation according to another specific embodiment of the present invention.

Another specific implementation of block 304 is now described with reference to FIG. 5. In this embodiment, the network client 112 can be a mobile network client accessing the LAN 100 wirelessly, such as network client 112a accessing the LAN 100 using wireless access point 104 in FIG. 1, or the network client 112 can be a fixed or mobile network client accessing the LAN 100 using a wired line connection, such as network clients 112c and 112f in FIG. 1.

In block 502, the network client 112 accesses the MAC address of the router 108. This can be done by asking the router 108 for its MAC address, or noting the MAC address of the router 108 when establishing communication with the LAN 100. The router MAC address is freely accessible on the LAN 100 and there are various ways the network client 112 can access it.

In block 504, the network client 112 queries a database associating the MAC address of the router 108 with the physical location of the router 108. This database can be the same database described above with reference to FIG. 4, or it can be a similar database. The MAC address of the router 108 is associated by the database with a location. The location can include the coordinates of the router 108 (i.e. latitude, longitude, altitude), and an area of coverage of the router 108. The location can include other information, such as a floor (or several floors) of a building serviced by the router 108.

In block 506, the network client 112 estimates its location using the location and service area of the router 108. In one embodiment, the network client 112 approximates its location as being somewhere in the service area of the router 108. In other embodiments, the network client 112 can use other information to improve on this estimate.

Figure 6:
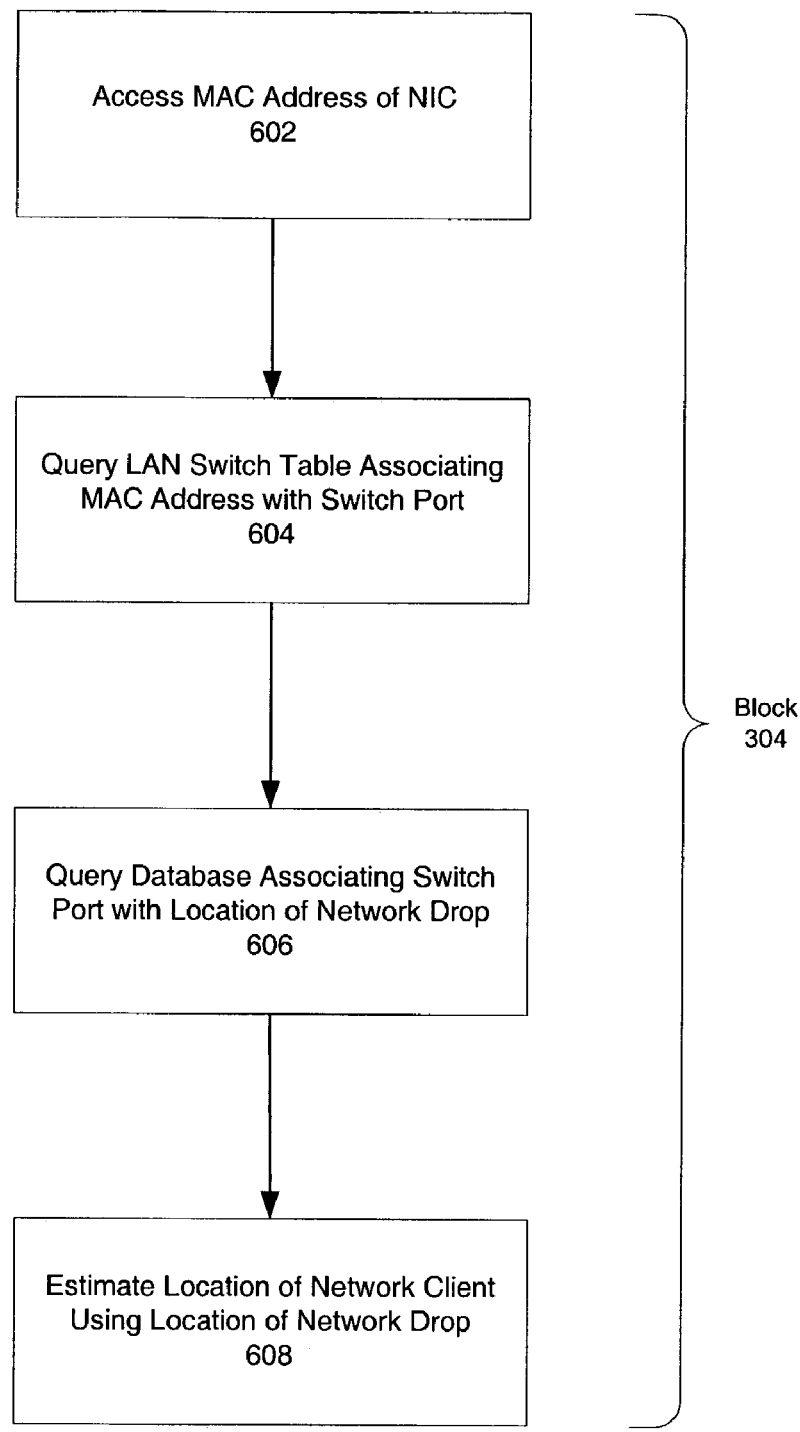
FIG. 6 is a flow diagram illustrating location estimation according to another specific embodiment of the present invention.

Another specific implementation of block 304 is now described with reference to FIG. 6. In this embodiment, the network client 112 can be a mobile network client accessing the LAN 100 wirelessly, such as network client 112a accessing the LAN 100 using wireless access point 104 in FIG. 1, or the network client 112 can be a fixed or mobile network client accessing the LAN 100 using a wired line connection, such as network clients 112c and 112f in FIG. 1.

In block 602, the network client 112 accesses the MAC address of its NIC, such as NIC 228 in FIG. 2. Since the network client 112 has access to the NIC 228, it can retrieve this MAC address readily.

In block 604, the network client 112 queries a database associating the MAC address of the NIC 228 with a switch port of a LAN switch, such as LAN switch 106a in FIG. 1. This database is used by the LAN switch 106a to keep track of the various devices using the LAN 100 or LAN segment 102a. In one embodiment, this database is a table of switch port numbers. When a device, such as a network client 112 or a server 110, is connected to the switched LAN 100, the switch port used to connect the device is associated in the table with the MAC address of the device, i.e. the MAC address of the NIC used by the device to interface with the LAN 100.

In block 606, the network client 112 queries a database associating the switch port returned from the query in block 604, i.e. the switch port used to connect the network device 112 to the LAN switch 106a, with a location of the switch port. This database can be the same database described above with reference to FIG. 4, or it can be a similar database. The switch port number is associated by the database with a location. The location can include the coordinates of network drop connected to the switch port (i.e. latitude, longitude, altitude). The location can include other information, such as a floor of a building on which the network drop is located.

In block 606, the network client 112 estimates its location using the location of the network drop. In one embodiment, the network client 112 approximates its location as being somewhere in the near vicinity of the network drop, since the drop cable tends to be of short length. In other embodiments, the network client 112 can use other information to improve on this estimate.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by a unit or units such as hardware components or may be embodied in machine-executable instructions, which may be used to cause one or more processors programmed with the instructions to perform the processes. Alternatively, the processes may be performed by a combination of hardware and software. As used in herein, a unit performing a process can be one or more processors, an ASIC, a controller such as a micro-controller, or any other module capable of carrying out the process.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:

establishing communication between a network client and a Local Area Network (LAN), the LAN having a plurality of infrastructure nodes, each of the plurality of infrastructure nodes having a globally unique media access control (MAC) address;

associating the MAC addresses with the network client upon establishment of a connection between the network client and the LAN, wherein the MAC addresses are provided via, the plurality of infrastructure nodes, the plurality of infrastructure nodes including a wireless access point, a switch, wired access point, and a router, wherein the wireless access point communicates broadcast signals containing the MAC addresses;

detecting, via a hardware processor in the network client, the MAC addresses in the broadcast signals; and estimating a location of the network client via the detection of the MAC addresses, wherein the location is estimated via querying a database, wherein the network client associates the MAC addresses of the plurality of infrastructure nodes queried from the database, the database includes location of coordinates and communication range of the plurality of infrastructure nodes, wherein the coordinates include a latitude, a longitude, and an altitude of the plurality of infrastructure nodes; wherein the location includes a plurality of floors of a building serviced by the router; and wherein the communication range includes an area covered by the plurality of infrastructure nodes that is accessible by the network client, wherein the database further comprising switch port of a LAN switch, a wireless access point-related MAC address of the wireless access point, and a router-related MAC address associated with the router, wherein the switch port containing location of a network drop coupled to the switch port, wherein the location is estimated by the network client using a MAC address burned on a network interface card (NIC) of the network client.

2. The method of claim 1, wherein the network client comprises a mobile network client having any one of a laptop computer, a notebook personal computer (PC), a personal digital assistant (PDA), a desk top computer, and a network peripheral device.

3. A system comprising:

a network client in communication with a Local Area Network (LAN), the LAN having a plurality of infrastructure nodes, each of the plurality of infrastructure nodes having a globally unique media access control (MAC) address;

associating the MAC addresses with the network client upon establishment of a connection between the network client and the LAN, wherein the MAC addresses are provided via a plurality of infrastructure nodes, the plurality of infrastructure nodes including a wireless access point, a switch, wired access point, and a router, wherein the wireless access point communicates broadcast signals containing the MAC addresses; and a hardware processor in the network client to detect the MAC addresses in the broadcast signals, and estimate a location of the network client via the detection of the MAC addresses, wherein the location is estimated via querying a database, wherein the network client associates the MAC addresses of the plurality of infrastructure nodes queried from the database, he database includes location of coordinates and communication range of the plurality of infrastructure nodes, wherein the coordinates include a latitude, a longitude, and an altitude of the plurality of infrastructure nodes, wherein the location includes a plurality of floors of a building serviced by the router; and wherein the communication range includes an area covered by the plurality of infrastructure nodes that is accessible by the network client, wherein the database further comprising switch port of LAN switch, a wireless access point-related MAC address of the wireless access point, and a router-related MAC address associated with the router wherein the switch port containing location of a network drop coupled to the switch port, where in the location is estimated by the network client using a MAC address burned on a network interface card (NIC) of the network client.

4. The system of claim 3, wherein the network client comprises a mobile network client having any on of a laptop computer, a notebook personal computer(PC), a personal digital assistant (PDA), a desktop computer, and a network peripheral device.

5. The system of claim 3, wherein the NIC comprises an Ethernet card, and the LAN comprises the Ethernet.

6. A non-transitory machine-readable medium comprising instructions which executed by a hardware processor in a machine, the instructions cause a hardware processor in a machine to:

establish communication between a network client and a Local Area Network (LAN), the LAN having a plurality of infrastructure nodes, each of the plurality of infrastructure nodes having a globally unique media access control (MAC) address;

associate the MAC addresses with the network client upon establishment of a connection between the network client and the LAN, wherein the MAC addresses are provided via the plurality of infrastructure nodes, the plurality of infrastructure nodes including one a wireless access point, a switch, a router and a wired access point, wherein the wireless access point communicates broadcast signals containing the MAC addresses, detect, via a hardware processor in the network client, the MAC addresses in the broadcast signals; and estimate a location of the network client via the detection of the MAC addresses, wherein the location is estimated via querying a database, wherein the network client associates the MAC addresses of the plurality of infrastructure nodes queried from the database, the database includes location of coordinates and communication range of the plurality of infrastructure nodes, wherein the coordinates include a latitude, a longitude, and an altitude of the plurality of infrastructure nodes, wherein the communication range includes an area covered by the plurality of infrastructure nodes that is accessible by the network client, wherein the database further comprising switch port of a LAN switch, a wireless access point-related MAC address of the wireless access point, and a router-related MAC address associated with the router; and wherein the switch port containing location of a network drop coupled to the switch port; wherein the location is estimated by the network client using a MAC address burned on a network interface card (NIC) of the network client.

* * * * *

UNITED STATES PATENT AND TRADEMARK OFFICE
CERTIFICATE OF CORRECTION

| | | |
|---|---|---|
| PATENT NO. | : 7,734,760 B2 | Page 1 of 1 |
| APPLICATION NO. | : 10/367285 | |
| DATED | : June 8, 2010 | |
| INVENTOR(S) | : Cen et al. | |

It is certified that error appears in the above-identified patent and that said Letters Patent is hereby corrected as shown below:

IN THE CLAIMS:

In column 7, claim 3, at line 12 delete, "he" and insert --the--.

Signed and Sealed this
Twenty-ninth Day of March, 2011

David J. Kappos
*Director of the United States Patent and Trademark Office*